United States Patent
Hu et al.

(10) Patent No.: US 10,801,679 B2
(45) Date of Patent: Oct. 13, 2020

(54) APPARATUSES AND METHODS FOR ASSEMBLING LUMINAIRES

(71) Applicant: RAB Lighting Inc., Northvale, NJ (US)

(72) Inventors: Jiang Hu, Ningbo (CN); Nicholas Calaceto, Northvale, NJ (US); Vincenzo Guercio, Wallkill, NY (US)

(73) Assignee: RAB Lighting Inc., Northvale, NJ (US)

( * ) Notice: Subject to any disclaimer, the term of this patent is extended or adjusted under 35 U.S.C. 154(b) by 88 days.

(21) Appl. No.: 16/154,308

(22) Filed: Oct. 8, 2018

(65) Prior Publication Data
US 2020/0109827 A1 Apr. 9, 2020

(51) Int. Cl.
| F21V 21/00 | (2006.01) |
| F21S 2/00 | (2016.01) |
| F21V 14/00 | (2018.01) |
| F21V 8/00 | (2006.01) |

(52) U.S. Cl.
CPC ............ *F21S 2/005* (2013.01); *F21V 14/006* (2013.01); *G02B 6/0018* (2013.01); *G02B 6/0068* (2013.01)

(58) Field of Classification Search
CPC ...... F21S 2/005; F21V 14/006; G02B 6/0018; G02B 6/0069
(Continued)

(56) References Cited

U.S. PATENT DOCUMENTS

| 1,821,733 A | 9/1931 | Thibodeau |
| 2,831,453 A | 4/1958 | Hardesty |

(Continued)

FOREIGN PATENT DOCUMENTS

| CN | 204534353 | 8/2015 |
| DE | 102004046256 | 4/2006 |

(Continued)

OTHER PUBLICATIONS

Yimin Gu and Nadarajah Narendran, Design and evaluation of an LED based light fixture. Third International Conference on Solid State Lighting, Proceedings of SPIE, 2004, 318-329, Lighting Research Center, Rensselaer Polytechnic Institute, Troy NY.

(Continued)

*Primary Examiner* — Laura K Tso
(74) *Attorney, Agent, or Firm* — Frost Brown Todd LLC; Dennis S. Schell; Kevin C. Oschman

(57) ABSTRACT

Example embodiments include modular lighting fixtures and methods for forming the same. Some include light emitters and base members with mounting locations for the light emitters, the light emitters and base members being combinable in varying combinations with each combination producing a different lighting effect. Some embodiments include a light guide, such as a planar light guide, that receives and redirects light from the light emitters. Additional embodiments include a reflector with portions that are positioned near a mounting location where no light emitter is mounted when the reflector is mounted to a base member. Further embodiments include a reflector with portions that are positioned near the mounting locations when mounted to a base member, the portions being easily removed, such as with an unpowered hand tool, to avoid interference with a light emitting member mounted adjacent to where the removable portion would be if not removed from the reflector.

26 Claims, 11 Drawing Sheets

(58) Field of Classification Search
USPC .................................................. 362/235, 242
See application file for complete search history.

(56) References Cited

U.S. PATENT DOCUMENTS

| | | | |
|---|---|---|---|
| 3,070,913 A | 1/1963 | Miller | |
| 3,213,751 A | 10/1965 | Etal | |
| 3,328,570 A | 6/1967 | Balchunas | |
| 3,692,383 A | 9/1972 | Hedrod et al. | |
| D242,943 S | 1/1977 | Lazerson | |
| 4,043,636 A | 8/1977 | Eberhardt et al. | |
| 4,183,628 A | 1/1980 | Lesser et al. | |
| 4,257,084 A | 3/1981 | Reynolds | |
| 4,260,220 A | 4/1981 | Whitehead | |
| 4,373,282 A | 2/1983 | Wragg | |
| 4,576,850 A | 3/1986 | Martens | |
| 4,714,983 A | 12/1987 | Lang | |
| 4,767,172 A | 8/1988 | Nichols et al. | |
| 4,890,201 A | 12/1989 | Toft | |
| 4,909,604 A | 3/1990 | Kobayashi et al. | |
| 4,914,553 A | 4/1990 | Hamada et al. | |
| 4,978,952 A | 12/1990 | Irwin | |
| 4,984,114 A | 1/1991 | Takeuchi et al. | |
| 5,005,108 A | 4/1991 | Pristash et al. | |
| 5,040,098 A | 8/1991 | Tanaka et al. | |
| 5,050,946 A | 9/1991 | Hathaway et al. | |
| 5,070,431 A | 12/1991 | Kitazawa et al. | |
| 5,076,591 A | 12/1991 | Gentile | |
| 5,093,176 A | 3/1992 | Pribonic et al. | |
| 5,128,842 A | 7/1992 | Kenmochi | |
| D341,221 S | 11/1993 | Elazari | |
| 5,309,544 A | 5/1994 | Saxe | |
| 5,339,179 A | 8/1994 | Rudisill et al. | |
| 5,359,691 A | 10/1994 | Tai et al. | |
| 5,390,436 A | 2/1995 | Ashall | |
| 5,404,277 A | 4/1995 | Linblad | |
| 5,428,468 A | 6/1995 | Zimmerman et al. | |
| 5,461,507 A | 10/1995 | Westland et al. | |
| 5,475,043 A | 12/1995 | Shiga et al. | |
| 5,555,160 A | 9/1996 | Tawara et al. | |
| 5,572,411 A | 11/1996 | Watai et al. | |
| 5,584,556 A | 12/1996 | Yokoyama et al. | |
| 5,598,281 A | 1/1997 | Zimmerman et al. | |
| 5,659,410 A | 8/1997 | Koike et al. | |
| 5,664,862 A | 9/1997 | Redmond et al. | |
| 5,677,702 A | 10/1997 | Inoue et al. | |
| 5,719,649 A | 2/1998 | Shono et al. | |
| 5,735,590 A | 4/1998 | Kishima et al. | |
| 5,761,355 A | 6/1998 | Kuper et al. | |
| 5,897,201 A | 4/1999 | Simon | |
| 5,961,198 A | 10/1999 | Hira et al. | |
| 5,980,054 A | 11/1999 | Fukui et al. | |
| 6,097,549 A | 8/2000 | Jenkins et al. | |
| 6,129,439 A | 10/2000 | Hou et al. | |
| 6,130,730 A | 10/2000 | Jannson et al. | |
| 6,134,092 A | 10/2000 | Pelka et al. | |
| 6,161,939 A | 12/2000 | Bansbach | |
| 6,164,790 A | 12/2000 | Lee | |
| 6,164,791 A | 12/2000 | Gwo-Juh et al. | |
| 6,167,182 A | 12/2000 | Shinohara et al. | |
| 6,193,383 B1 | 2/2001 | Onikiri et al. | |
| 6,257,737 B1 | 7/2001 | Marshall et al. | |
| 6,259,854 B1 | 7/2001 | Shinji et al. | |
| 6,285,425 B1 | 9/2001 | Akins et al. | |
| 6,367,941 B2 | 4/2002 | Lea et al. | |
| 6,367,949 B1 | 4/2002 | Pederson | |
| 6,379,016 B1 | 4/2002 | Boyd et al. | |
| 6,379,017 B2 | 4/2002 | Nakabayashi et al. | |
| 6,400,086 B1 | 6/2002 | Huter | |
| 6,456,437 B1 | 9/2002 | Lea et al. | |
| 6,536,921 B1 | 3/2003 | Simon | |
| 6,582,103 B1 | 6/2003 | Popovich et al. | |
| 6,601,984 B2 | 8/2003 | Yamamota et al. | |
| 6,612,723 B2 | 9/2003 | Futhey et al. | |
| 6,647,199 B1 | 11/2003 | Pelka et al. | |
| 6,661,665 B2 | 12/2003 | Tantoush et al. | |
| 6,712,481 B2 | 3/2004 | Parker et al. | |
| 6,724,543 B1 | 4/2004 | Chinniah et al. | |
| 6,745,506 B2 | 6/2004 | Maas et al. | |
| 6,752,505 B2 | 6/2004 | Parker et al. | |
| 6,755,556 B2 | 6/2004 | Gasquet et al. | |
| 6,758,582 B1 | 7/2004 | Hsiao et al. | |
| 6,773,139 B2 * | 8/2004 | Sommers | F21V 5/006 257/E25.02 |
| 6,775,460 B2 | 8/2004 | Steiner et al. | |
| 6,802,678 B2 | 10/2004 | Augis | |
| 6,845,212 B2 | 1/2005 | Gardiner et al. | |
| 6,854,857 B2 | 2/2005 | Hara et al. | |
| 6,891,677 B2 | 5/2005 | Nilsen et al. | |
| 6,924,943 B2 | 8/2005 | Minano et al. | |
| 7,006,306 B2 | 2/2006 | Falicoff et al. | |
| 7,025,482 B2 | 4/2006 | Yamashita et al. | |
| 7,085,460 B2 | 8/2006 | Leu et al. | |
| 7,104,672 B2 | 9/2006 | Zhang | |
| 7,131,764 B2 | 11/2006 | Hse et al. | |
| 7,163,324 B2 | 1/2007 | Pederson | |
| 7,175,330 B1 | 2/2007 | Chen | |
| 7,182,499 B2 | 2/2007 | Chen et al. | |
| 7,192,174 B2 | 3/2007 | Myoung | |
| 7,204,634 B2 | 4/2007 | Chen et al. | |
| 7,223,004 B2 | 5/2007 | Chen et al. | |
| 7,234,844 B2 | 6/2007 | Bolta et al. | |
| 7,246,931 B2 | 7/2007 | Hsieh et al. | |
| 7,265,800 B2 | 9/2007 | Jagt et al. | |
| 7,292,967 B2 | 11/2007 | McDonough et al. | |
| D556,939 S | 12/2007 | Gajewski | |
| 7,311,431 B2 | 12/2007 | Chew et al. | |
| 7,322,718 B2 | 1/2008 | Setomoto et al. | |
| D563,036 S | 2/2008 | Miyairi et al. | |
| 7,344,279 B2 | 3/2008 | Mueller et al. | |
| 7,344,296 B2 | 3/2008 | Matsui et al. | |
| 7,387,403 B2 | 6/2008 | Mighetto | |
| 7,393,132 B2 | 7/2008 | Chen | |
| 7,445,362 B2 | 11/2008 | Compton et al. | |
| 7,484,875 B2 | 2/2009 | Kim et al. | |
| 7,486,854 B2 | 2/2009 | Van Ostrand et al. | |
| D588,301 S | 3/2009 | Sabemig | |
| 7,559,672 B1 | 7/2009 | Parkyn et al. | |
| 7,582,911 B2 | 9/2009 | Lynch et al. | |
| D602,192 S | 10/2009 | Tunze | |
| 7,611,264 B1 | 11/2009 | Chang et al. | |
| 7,674,009 B2 | 3/2010 | Chang | |
| 7,703,945 B2 | 4/2010 | Leung et al. | |
| 7,766,511 B2 | 8/2010 | Zampini et al. | |
| 7,780,306 B2 | 8/2010 | Hoshi | |
| 7,810,951 B1 | 10/2010 | Lee et al. | |
| 7,841,734 B2 | 11/2010 | Wilcox | |
| 7,857,482 B2 | 12/2010 | Reo et al. | |
| 7,857,497 B2 * | 12/2010 | Koike | F21V 29/89 362/545 |
| 7,934,854 B2 | 5/2011 | Anglikowski et al. | |
| 7,972,036 B1 | 7/2011 | Schach et al. | |
| 8,007,135 B2 | 8/2011 | Xiang et al. | |
| 8,068,197 B2 | 11/2011 | Mifune et al. | |
| 8,075,157 B2 | 12/2011 | Zhang et al. | |
| D652,984 S | 1/2012 | Schaeken | |
| 8,096,681 B2 | 1/2012 | Fang et al. | |
| 8,113,704 B2 | 2/2012 | Bae et al. | |
| D656,265 S | 3/2012 | Sabemig | |
| 8,152,339 B2 | 4/2012 | Morgan | |
| 8,152,352 B2 | 4/2012 | Richardson | |
| 8,167,474 B2 | 5/2012 | Tanoue et al. | |
| 8,192,049 B2 | 6/2012 | Hyun et al. | |
| D663,470 S | 7/2012 | Ruiz | |
| 8,212,263 B2 | 7/2012 | Bierhuizen et al. | |
| 8,231,259 B2 | 7/2012 | Keller et al. | |
| 8,292,467 B2 | 10/2012 | Vissenberg et al. | |
| 8,297,818 B2 | 10/2012 | Richardson | |
| 8,301,002 B2 | 10/2012 | Shani | |
| 8,351,744 B2 | 1/2013 | Travis et al. | |
| 8,430,548 B1 | 4/2013 | Kelly et al. | |
| 8,434,892 B2 | 5/2013 | Zwak et al. | |
| 8,454,218 B2 | 6/2013 | Wang et al. | |
| 8,475,010 B2 | 7/2013 | Vissenberg et al. | |

(56) References Cited

U.S. PATENT DOCUMENTS

| | | | |
|---|---|---|---|
| 8,496,360 B2 | 7/2013 | Phillips, III et al. |
| 8,506,112 B1 | 8/2013 | Dau et al. |
| 8,534,901 B2 | 9/2013 | Panagotacos et al. |
| D693,045 S | 11/2013 | Kirschhoffer et al. |
| D695,945 S | 12/2013 | Wright |
| 8,641,219 B1 | 2/2014 | Johnson et al. |
| 8,696,173 B2 | 4/2014 | Urtiga et al. |
| 8,702,281 B2 | 4/2014 | Okada et al. |
| 8,733,982 B2 | 5/2014 | Richardson |
| 8,740,440 B2 | 6/2014 | Mizuno et al. |
| D711,584 S | 8/2014 | Parker et al. |
| 8,827,531 B2 | 9/2014 | Richardson et al. |
| 8,853,942 B1 | 10/2014 | Lewis, Jr. et al. |
| 8,864,360 B2 | 10/2014 | Parker et al. |
| D718,485 S | 11/2014 | Wright |
| 8,911,132 B1 | 12/2014 | Foy et al. |
| 8,944,662 B2 | 2/2015 | Thompson et al. |
| 9,046,225 B2 | 6/2015 | Meyers et al. |
| 9,062,864 B2 | 6/2015 | Guercio et al. |
| 9,110,209 B2 | 8/2015 | Blessitt et al. |
| D738,556 S | 9/2015 | Macura |
| D741,535 S | 10/2015 | Wright |
| 9,156,511 B2 | 10/2015 | Rohrlich et al. |
| D743,607 S | 11/2015 | Verelst |
| 9,261,639 B1 | 2/2016 | Tuohioja |
| 9,279,576 B2 | 3/2016 | Guercio et al. |
| 9,291,320 B2 | 3/2016 | Durkee |
| 9,335,464 B2 | 5/2016 | Grigore |
| 9,337,373 B2 | 5/2016 | Morgan et al. |
| 9,366,799 B2 | 6/2016 | Wilcox et al. |
| 9,383,508 B2 | 7/2016 | Getzinger et al. |
| 9,448,353 B2 | 9/2016 | Holman et al. |
| 9,495,892 B2 | 11/2016 | Gongola et al. |
| 9,581,751 B2 | 2/2017 | Yuan et al. |
| 9,581,756 B2 | 2/2017 | Boomgaarden et al. |
| 9,587,808 B2 | 3/2017 | Speer et al. |
| 9,618,678 B1 | 4/2017 | Tickner et al. |
| D803,459 S | 11/2017 | Wright |
| 9,816,672 B1 | 11/2017 | Broughton |
| 9,995,444 B2 | 6/2018 | Leichner |
| 2002/0021385 A1 | 2/2002 | Nakabayashi et al. |
| 2002/0101551 A1 | 8/2002 | Akaoka |
| 2002/0131275 A1 | 9/2002 | Yamamoto et al. |
| 2004/0125590 A1 | 7/2004 | Tsai |
| 2004/0135933 A1 | 7/2004 | Leu et al. |
| 2004/0145885 A1 | 7/2004 | Chen |
| 2004/0213003 A1 | 10/2004 | Lauderdale et al. |
| 2004/0223314 A1 | 11/2004 | Ching-Huang et al. |
| 2004/0264188 A1 | 12/2004 | Tazawa et al. |
| 2005/0210643 A1 | 9/2005 | Mezei et al. |
| 2006/0002146 A1 | 1/2006 | Baba |
| 2006/0147151 A1 | 7/2006 | Wanninger et al. |
| 2006/0227536 A1 | 10/2006 | Haugaard et al. |
| 2007/0086171 A1 | 4/2007 | Araujo |
| 2007/0189033 A1 | 8/2007 | Watanabe et al. |
| 2007/0206384 A1 | 9/2007 | Compton et al. |
| 2008/0080188 A1 | 4/2008 | Wang |
| 2009/0027588 A1 | 1/2009 | Medendorp, Jr. et al. |
| 2009/0103294 A1 | 4/2009 | Zhang et al. |
| 2009/0196071 A1 | 8/2009 | Matheson et al. |
| 2009/0262530 A1 | 10/2009 | Tickner et al. |
| 2009/0267519 A1 | 10/2009 | Pearse |
| 2009/0268453 A1 | 10/2009 | Pearse |
| 2010/0008088 A1 | 1/2010 | Koizumi et al. |
| 2010/0091507 A1 | 4/2010 | Li et al. |
| 2010/0103668 A1 | 4/2010 | Lueken et al. |
| 2010/0133422 A1 | 6/2010 | Lin et al. |
| 2010/0135012 A1 | 6/2010 | Lee |
| 2010/0149787 A1 | 6/2010 | Zhang et al. |
| 2010/0157577 A1 | 6/2010 | Montgomery et al. |
| 2010/0177514 A1 | 7/2010 | Liu et al. |
| 2010/0203465 A1 | 8/2010 | Bria et al. |
| 2010/0208460 A1 | 8/2010 | Ladewig et al. |
| 2010/0220497 A1 | 9/2010 | Ngai |
| 2010/0238671 A1 | 9/2010 | Catone et al. |
| 2011/0013420 A1 | 1/2011 | Coleman et al. |
| 2011/0019409 A1 | 1/2011 | Wronski |
| 2011/0038151 A1* | 2/2011 | Carraher ................ F21S 8/08 362/242 |
| 2011/0128733 A1 | 6/2011 | Chen et al. |
| 2011/0170294 A1 | 7/2011 | Mier-Langner et al. |
| 2011/0194258 A1 | 8/2011 | Kodadek, III |
| 2011/0233568 A1 | 9/2011 | An et al. |
| 2011/0304270 A1 | 12/2011 | Scarpelli |
| 2011/0309735 A1 | 12/2011 | Parker et al. |
| 2011/0317436 A1 | 12/2011 | Kuan |
| 2012/0008338 A1 | 1/2012 | Ono et al. |
| 2012/0043885 A1 | 2/2012 | Lai |
| 2012/0049759 A1 | 3/2012 | Pezzutti et al. |
| 2012/0069579 A1 | 3/2012 | Koh et al. |
| 2012/0140461 A1 | 6/2012 | Pickard |
| 2012/0182767 A1 | 7/2012 | Petcavich et al. |
| 2012/0257383 A1 | 10/2012 | Zhang |
| 2012/0268916 A1 | 10/2012 | Yoo |
| 2012/0281432 A1 | 11/2012 | Parker et al. |
| 2012/0289671 A1 | 11/2012 | Takaai et al. |
| 2012/0300456 A1 | 11/2012 | Phillips, III et al. |
| 2012/0307496 A1 | 12/2012 | Phillips, III et al. |
| 2012/0314449 A1 | 12/2012 | McCollum et al. |
| 2012/0327652 A1 | 12/2012 | Lee |
| 2013/0003363 A1 | 1/2013 | Lu et al. |
| 2013/0044480 A1 | 2/2013 | Sato et al. |
| 2013/0107518 A1 | 5/2013 | Boyer et al. |
| 2013/0107527 A1 | 5/2013 | Boyer et al. |
| 2013/0170210 A1 | 7/2013 | Athalye |
| 2013/0215612 A1* | 8/2013 | Garcia ................ F21V 5/007 362/248 |
| 2013/0279198 A1 | 10/2013 | Lin et al. |
| 2014/0029257 A1 | 1/2014 | Boyer et al. |
| 2014/0043850 A1 | 2/2014 | Thompson et al. |
| 2014/0153253 A1 | 6/2014 | Chen |
| 2014/0185304 A1 | 7/2014 | Hsiao et al. |
| 2014/0212090 A1 | 7/2014 | Wilcox et al. |
| 2014/0218875 A1 | 8/2014 | Nakayama et al. |
| 2014/0226330 A1 | 8/2014 | Yun |
| 2014/0268869 A1 | 9/2014 | Blessitt et al. |
| 2014/0268879 A1 | 9/2014 | Mizuyama et al. |
| 2014/0270672 A1 | 9/2014 | Durkee |
| 2014/0286076 A1 | 9/2014 | McCollum et al. |
| 2014/0293189 A1 | 10/2014 | Kukunaga et al. |
| 2014/0355302 A1 | 12/2014 | Wilcox et al. |
| 2015/0049505 A1 | 2/2015 | Wang et al. |
| 2015/0049511 A1 | 2/2015 | Tarsa et al. |
| 2015/0338059 A1 | 11/2015 | Allen et al. |
| 2015/0338564 A1 | 11/2015 | Zhang et al. |
| 2016/0131331 A1 | 5/2016 | Parker et al. |
| 2016/0320553 A1 | 11/2016 | Grigore |
| 2017/0090097 A1 | 3/2017 | Zhang |
| 2017/0242182 A1 | 8/2017 | Diana et al. |
| 2018/0045878 A1 | 2/2018 | Murata et al. |
| 2018/0074255 A1 | 3/2018 | Den Breejen et al. |

FOREIGN PATENT DOCUMENTS

| | | |
|---|---|---|
| EP | 0594089 | 6/2001 |
| EP | 1716438 | 11/2006 |
| EP | 2045633 | 4/2009 |
| EP | 2241800 | 1/2011 |
| EP | 2708803 | 3/2014 |
| EP | 2811221 | 12/2014 |
| EP | 2883094 | 6/2015 |
| JP | 2009259708 | 11/2009 |
| JP | 2010153215 | 7/2010 |
| RU | 110454 | 11/2011 |
| SE | 456359 | 9/1988 |
| WO | 2013094525 | 6/2013 |
| WO | 2016171505 | 10/2016 |

OTHER PUBLICATIONS http://www.koppglass.com/blog/how-to-design-with-leds-iterative-approach-yields-fully-optimized-lighting-systems/ (published Oct. 19, 2015).

(56) References Cited

OTHER PUBLICATIONS

Philips Gardco; Garage & Canopy SoftView lights product pages, Mar. 2018.
http://www.e-litecom.com/webapp/eng/research/blu.jsp.
Eaton; Top Tier LED Installation Instructions; Publication No. IB515005EN; Oct. 12, 2016.
Eaton's Cooper Lighting Business; Top Tier LED Parking Garage and Canopy Luminaire product page; 2015.
Eaton, McGraw-Edison; TT Toptier LED Solid State LED, Parking Garage/Canopy/Low-Bay Luminaire product page; Oct. 9, 2017.
Philips, Gardco; Garage & Canopy SoftView LED parkings luminaires product page; Apr. 2018.

* cited by examiner

APPARATUSES AND METHODS FOR ASSEMBLING LUMINAIRES

FIELD

Embodiments of the present disclosure relate generally to luminaires, for example lighting fixtures, and to luminaire assemblies that facilitate easy configuration setup during assembly.

BACKGROUND

Luminaires using light emitting diodes (LEDs) have become increasingly popular due to their low power requirements. However, the inventors of the current disclosure realized that problems exist with the manufacturing process and, for example, the complexity with which luminaires with different lighting effects (for example, light distribution patterns and/or intensities) are assembled. Certain preferred features of the present disclosure address these and other needs and provide other important advantages.

SUMMARY

Embodiments of the present disclosure provide an improved apparatuses and methods for assembling luminaires. Further embodiments of the present disclosure provide improved lighting fixtures, for example modular lighting fixtures, and methods for forming the same.

Various aspects of different embodiments of the present disclosure are expressed in the following three (3) paragraphs:

One embodiment of the present disclosure includes a method of manufacturing a luminaire, comprising: selecting a lighting base from a plurality of similar lighting bases, each lighting base including a plurality of mounting locations and a plurality of location indicators, each location indicator being associated with a mounting location, and each location indicator being identifiable from the other of the plurality of location indicators; selecting at least one light emitting member from a plurality of similar light emitting members, each of the plurality of light emitting members being configured to mount to a mounting location; dentifying a particular mounting location and associated location indicator to which the light emitting member can be attached to achieve a desired lighting pattern from predetermined information, the predetermined information correlating different illumination patterns with the mounting of light emitting members at different mounting locations; locating on the selected lighting base a location indicator corresponding to the location indicator identified from the predetermined information; and mounting the selected light emitting member to the mounting location on the selected lighting base associated with the located location indicator.

Another embodiment of the present disclosure includes a configurable lighting kit, comprising: a plurality of light guides; a plurality of light emitting members; a plurality of base members, each base member configured to connect to a light guide, each base member defining a plurality of mounting locations and a plurality of labels, each mounting location configured to mount to one of the plurality of light emitting members, each label being associated with a different mounting location, and each label being identifiably distinct from the other labels; and an information key identifying two different groupings of one or more mounting location labels; wherein one of the plurality of light guides, one of the plurality of base members, and one of the plurality of light emitting members combine in two configurations including, a first configuration wherein a light guide selected from the plurality of light guides is connected to a base member selected from the plurality of base members and a light emitting member selected from the plurality of light emitting members is mounted to a mounting location selected from the base member's plurality of mounting locations according to a first of the two different information key groupings, the first configuration producing a first lighting pattern when the light emitting member is illuminated, and a second configuration wherein a light guide selected from the plurality of light guides is connected to a base member selected from the plurality of base members and a light emitting member selected from the plurality of light emitting members is mounted to a mounting location selected from the base member's plurality of mounting locations according a second of the two different information key groupings, the second configuration producing a second lighting pattern when the light emitting member is illuminated, the second lighting pattern being different from the first lighting pattern.

Another embodiment of the present disclosure includes a A configurable lighting kit, comprising: a plurality of light guides; a plurality of light emitting members; a plurality of base members, each base member configured to connect to a light guide, each base member defining a plurality of mounting locations and a plurality of labels, each mounting location configured to mount to one of the plurality of light emitting members, each label being associated with a different mounting location, and each label being identifiably distinct from the other labels; and means for identifying two different groupings of one or more mounting location labels; wherein one of the plurality of light guides, one of the plurality of base members, and one of the plurality of light emitting members combine in two configurations including, a first configuration wherein a light guide selected from the plurality of light guides is connected to a base member selected from the plurality of base members and a light emitting member selected from the plurality of light emitting members is mounted to a mounting location selected from the base member's plurality of mounting locations according to a first of the two different information key groupings, the first configuration producing a first lighting pattern when the light emitting member is illuminated, and a second configuration wherein a light guide selected from the plurality of light guides is connected to a base member selected from the plurality of base members and a light emitting member selected from the plurality of light emitting members is mounted to a mounting location selected from the base member's plurality of mounting locations according a second of the two different information key groupings, the second configuration producing a second lighting pattern when the light emitting member is illuminated, the second lighting pattern being different from the first lighting pattern.

Yet other embodiments include the features described in any of the previous three paragraphs, as combined with one or more of the aspects described in the remaining paragraphs in the summary.

Mounting a light guide to the lighting base with an edge surface of the light guide being adjacent the mounted light emitting member.

Wherein the light emitting members are elongated, the light guide is planar and includes at least three linear side edges, and the selected lighting base includes at least three mounting locations corresponding to the at least three linear side edges, the method comprising: arranging at least one mounting location to not have a light emitting member connected thereto.

Wherein the light guide is planar and includes at least one side edge, the method comprising: removing an edge portion of a reflector configured to reflect light emanating from at least one surface of the light guide back toward the light guide; and mounting the reflector adjacent the light guide with the removed edge portion positioned adjacent the mounting location on the selected lighting base associated with the located location indicator.

Wherein said selecting at least one light emitting member includes selecting at least two light emitting members, said identifying includes identifying at least two particular mounting locations and associated location indicators to which the at least two light emitting members can be attached to achieve a desired lighting pattern from predetermined information, and said mounting includes mounting the at least two selected light emitting members to the mounting locations on the selected lighting base associated with the located location indicators and with the at least two selected light emitting members contacting one another.

Wherein the plurality of mounting locations are configured to supply electrical power to a light emitting members mounted thereto.

Wherein the plurality of light guides are substantially similar, the plurality of light emitting members are substantially similar, and the plurality of base members are substantially similar.

Wherein each of the plurality of light emitting members is an elongated array of light emitting diodes, each of the plurality of light guides is a planar light guide, and the first configuration includes the elongated array of light emitting diodes being mounted adjacent an edge of the planar light guide.

Wherein each of the plurality of light emitting members in the first configuration contact one another inhibiting light from passing between the light emitting members.

Wherein the first configuration includes the elongated array of light emitting diodes being mounted adjacent an outer perimeter of the planar light guide.

Wherein the planar light guide is a regular polygon.

Wherein the plurality of base members include channels adjacent the mounting locations, the channels being configured to receive power cables for connecting mounted light emitting members to a power source.

Wherein the first configuration includes at least one mounting location with no light emitting member mounted thereto.

A plurality of reflectors, each configured to reflect light, wherein the first configuration includes a reflector selected from the plurality of reflectors connected to the base member, the reflector having a reflecting portion positioned proximally to a mounting location with no light emitting member mounted thereto.

A plurality of reflectors configured to reflect light, each with a plurality of reflecting portions, wherein the first configuration includes a reflector selected from the plurality of reflectors connected to the base member, the reflector having a reflecting portion positioned proximally to a mounting location with no light emitting member mounted thereto, and a surface adjacent a light emitting member, the surface being formed by the removal of a reflecting portion.

Wherein the plurality of light emitting members include at least two groups, each light emitting member in a group being substantially similar, the light emitting members in a first group being optically different from the light emitting members in a second group, and at least one light emitting member from each light emitting member group is included in at least one of the information key groupings.

Wherein the plurality of base members include at least two groups, each base member in a group being substantially similar, the base members in a first group being different from the base members in a second group, and at least one base member from each base member group is included in at least one of the information key groupings.

Wherein the plurality of base members include at least two groups, each base member in a group being substantially similar, the base members in a first group being different from the base members in a second group, and at least one base member from each base member group is included in at least one of the information key groupings.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
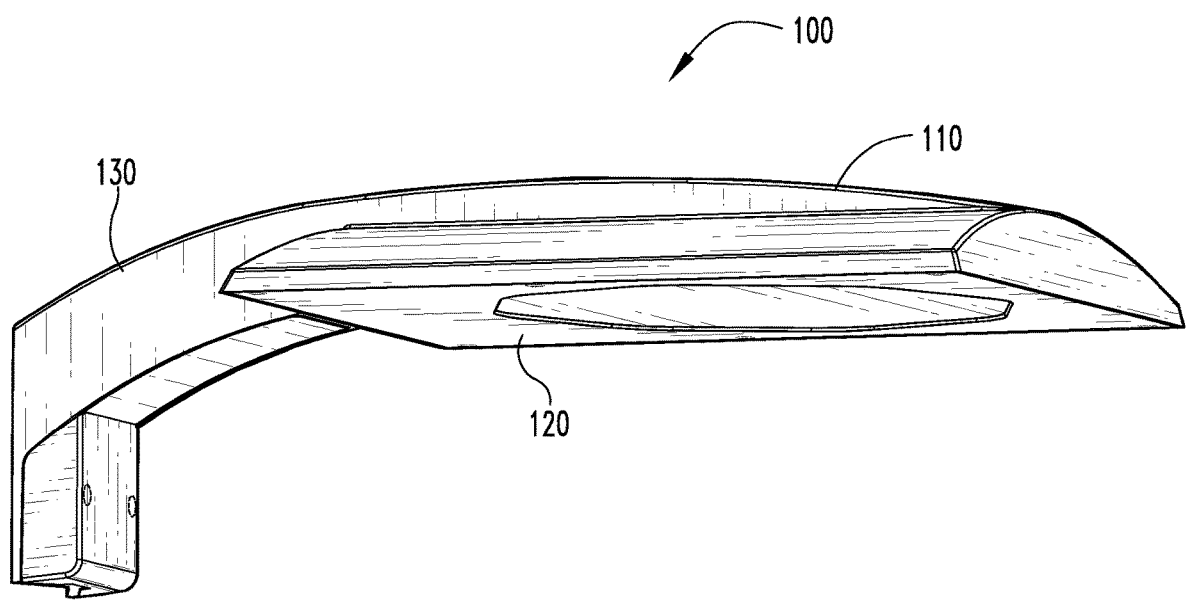
FIG. 1 is a front, bottom, right side perspective view of a luminaire according to one embodiment of the present disclosure.
Figure 2:
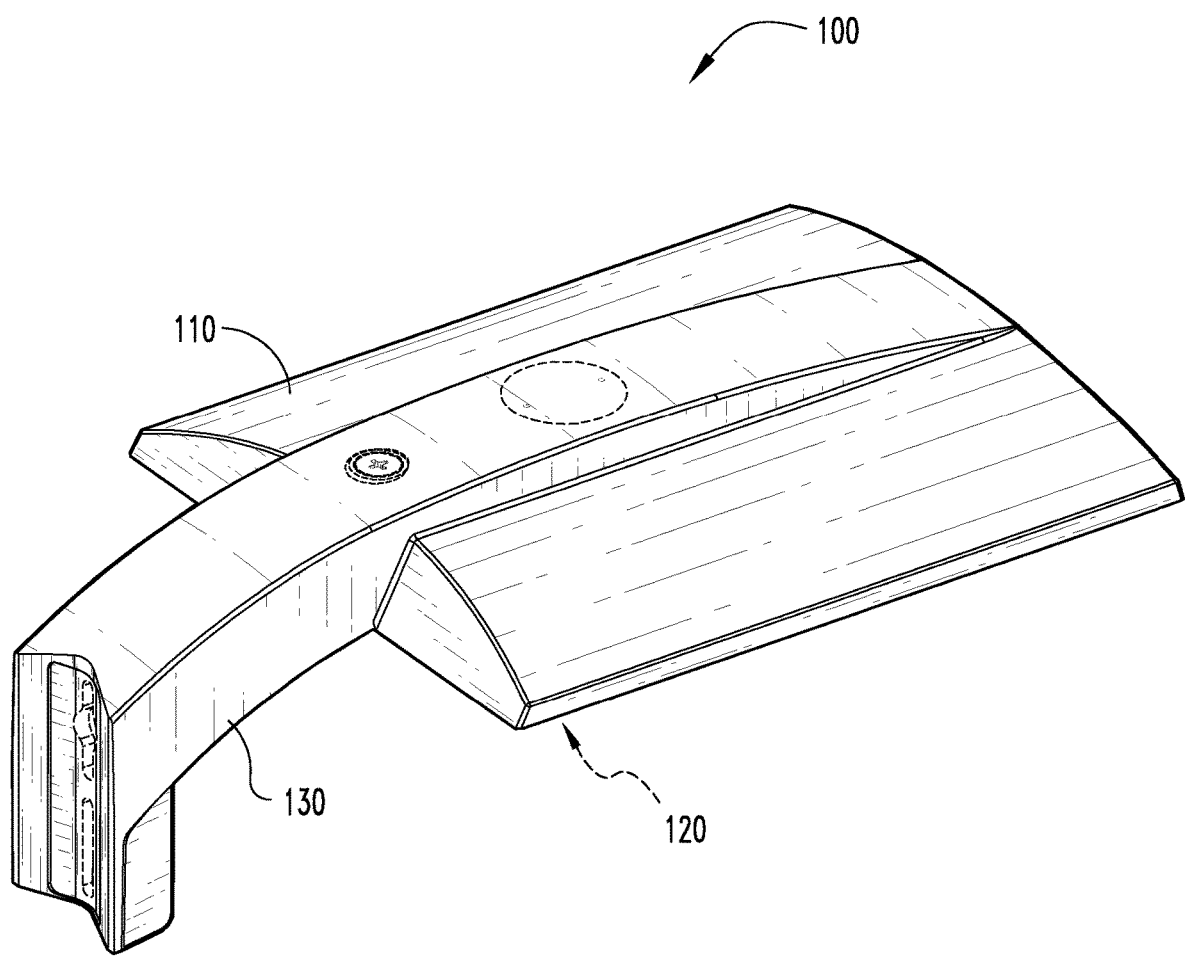
FIG. 2 is a rear, upper, right side perspective view of the luminaire depicted in FIG. 1.
Figure 3:
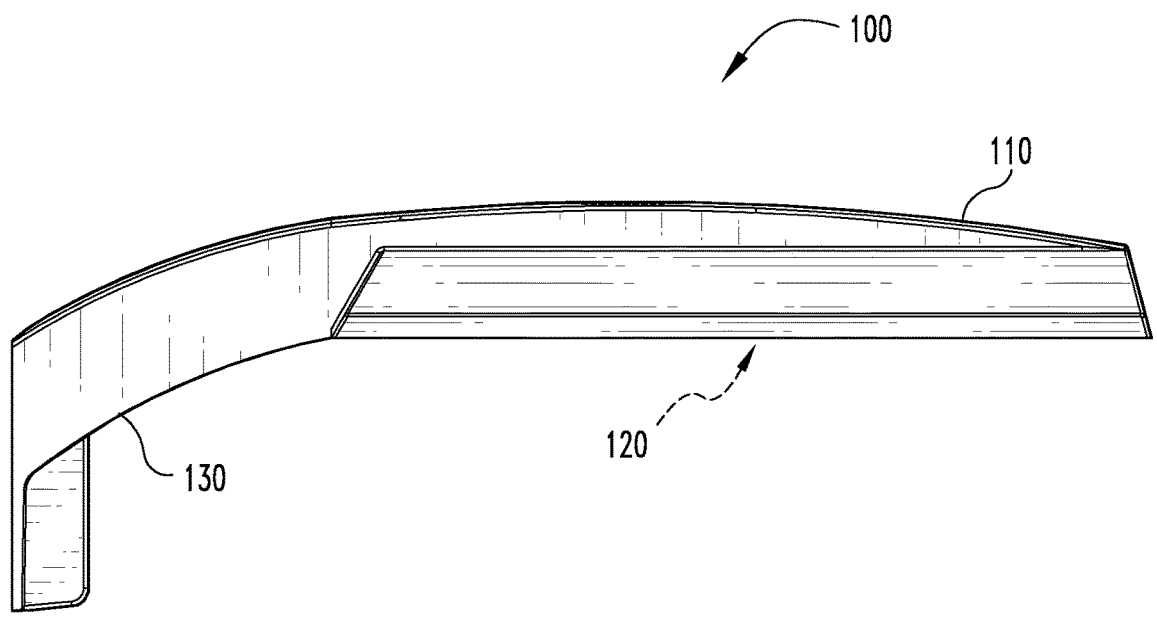
FIG. 3 is a right side plan view of the luminaire depicted in FIG. 1.
Figure 4:
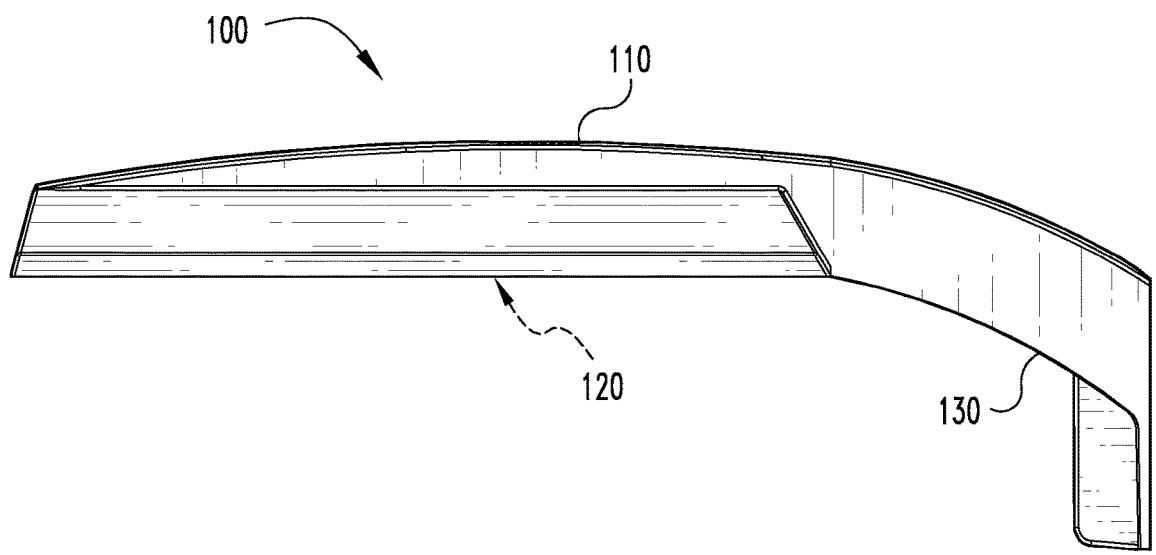
FIG. 4 is a left side plan view of the luminaire depicted in FIG. 1.
Figure 5:
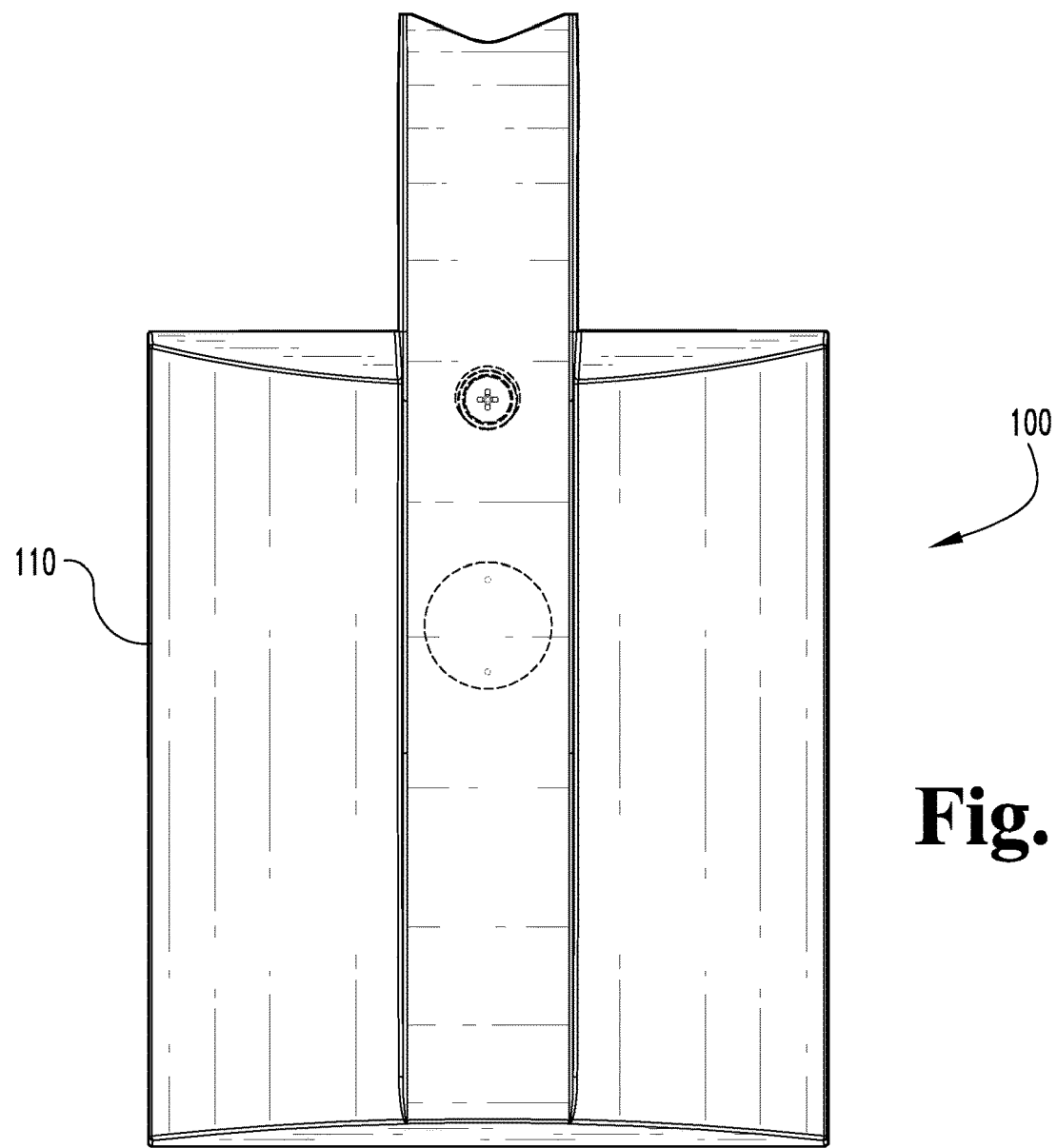
FIG. 5 is a top plan view of the luminaire depicted in FIG. 1.
Figure 6:
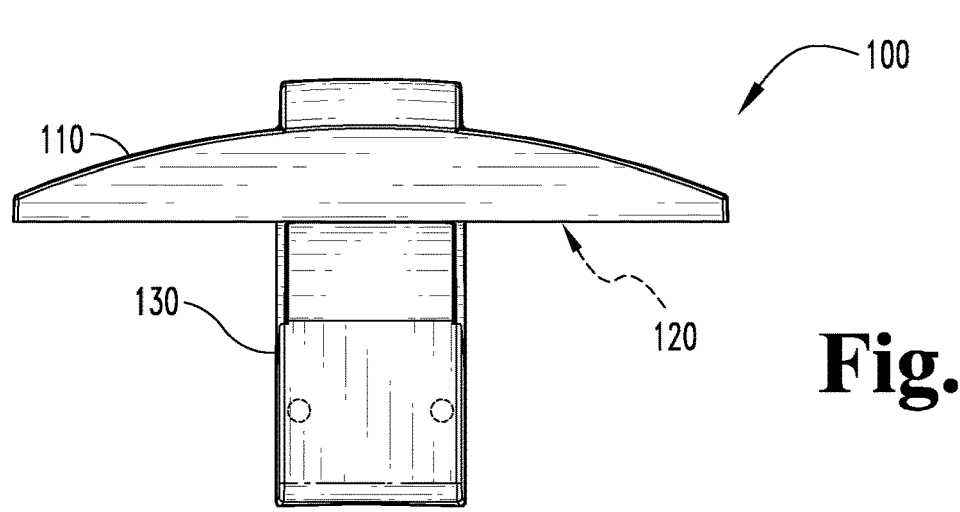
FIG. 6 is a front elevational view of the luminaire depicted in FIG. 1.
Figure 7:
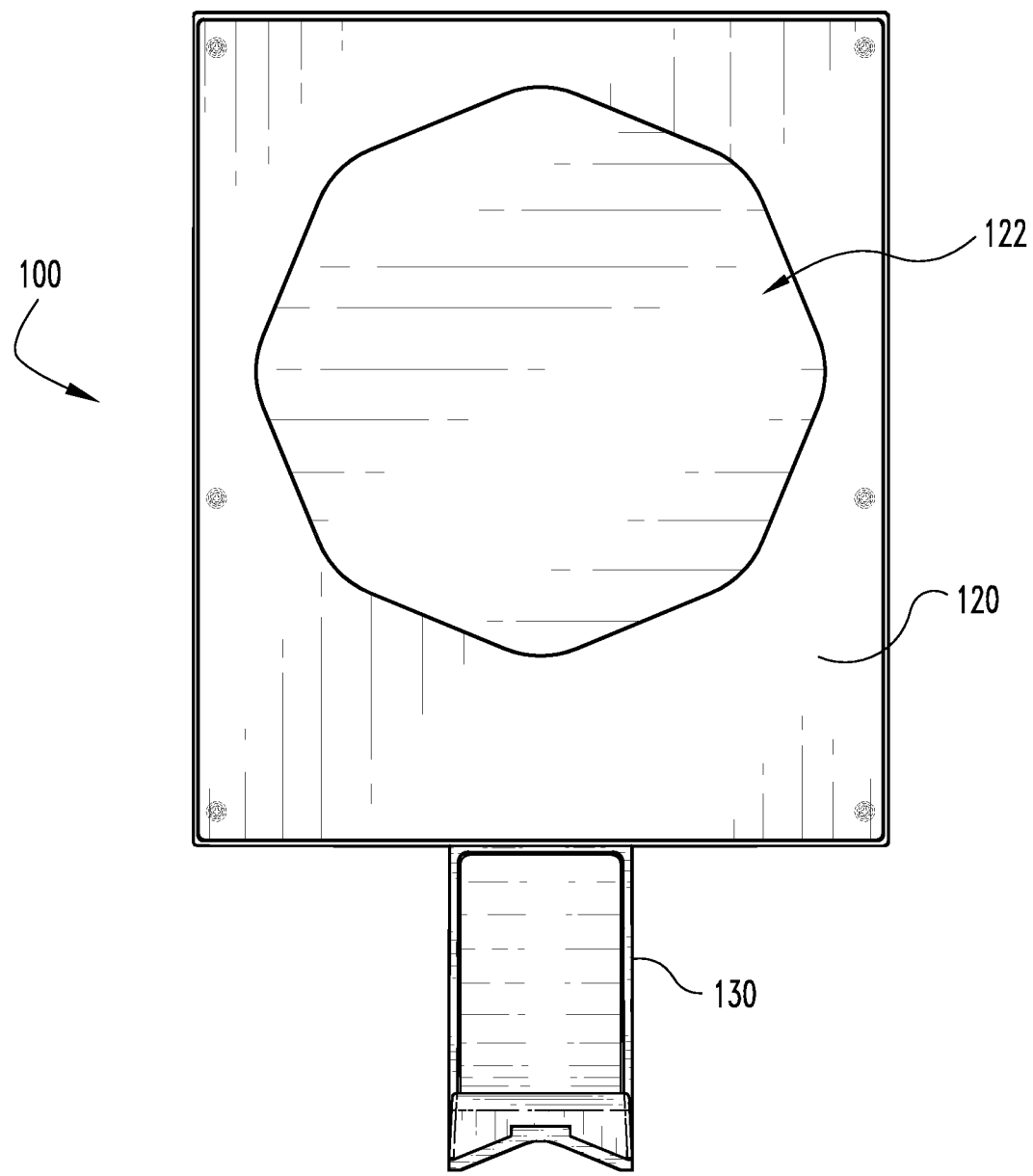
FIG. 7 is a bottom plan view of the luminaire depicted in FIG. 1.
Figure 8:
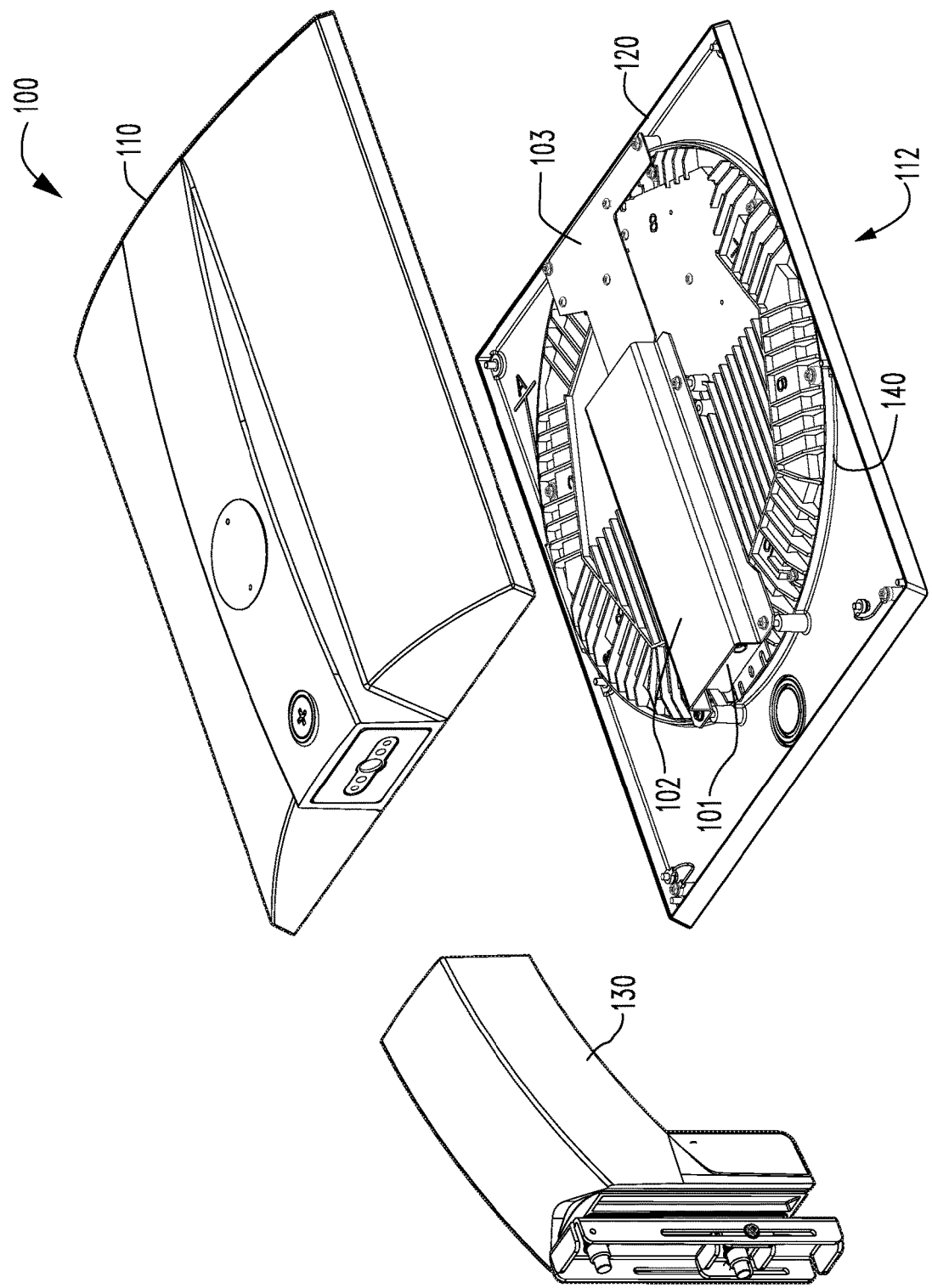
FIG. 8 is an exploded view of the luminaire depicted in FIG. 1 with the upper housing, lower assembly, and mounting member separated from one another.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure include luminaires (for example, lighting fixtures) with components that may be combined in different arrangements and combinations to produce luminaires with different optical properties, for example, lighting patterns and/or lighting intensities. For example, some embodiments include a housing into which different combinations of components (for example, light emitting members and/or lenses) are mounted to create luminaires with lighting patterns (and/or intensities) that differ based on the particular combination and mounting location of the various components. Information for identifying the different optical properties created by each combination can be used to create the luminaires. For example, information correlating one or more locations where one or more light emitters are to be mounted in relation to a lens can be used to help improve the speed and accuracy of the manufacturing process. After receiving work orders for producing luminaires with certain optical properties, personnel or machinery can compare the work orders with the predetermined information, quickly determine where in relation to a lens (for example, a light guide) one or more light emitters are to be mounted to produce a luminaire with the required optical properties, and easily identify which light emitters are to be the locations where the light emitters are to be mounted to fill the order. Different types of light emitters, lenses, and structural members on which the two are mounted can be correlated to assist with manufacturing luminaires. By using such a system for manufacturing luminaires, increases in manufacturing speed, efficiency, and accuracy can be achieved. The fixtures produced by these systems and methods can function with various controls, such as those that turn the fixture on or off based on customer input, sensor input, remotely controlled input, preset timing, all of which may be immediate or pre-programmed.

Depicted in FIGS. 1-8 is a luminaire 100 according to one embodiment of the present invention. Luminaire 100 includes an upper housing 110, a lower assembly 112 (see FIG. 8), a mounting member 130, and a lens (for example, light guide 170, which extends horizontally and into which the light from the light emitters enters, and which may be substantially planar as depicted in the figures). The lower assembly 112 includes a power regulator (for example, an LED driver 101), brackets 102 and 103, a lower housing 120 and a base member for attaching the light emitters (for example, heat sink 140).

FIGS. 9-12 depict various portions of the lower assembly 112, which includes light emitters (for example, light emitting members 150), a heat sink 140, an optional shock absorption member 161, a reflector 160, and a lens (for example, light guide 170). Heat sink 140 includes cooling fins 143, optional uncooled portion 144, and labels (for example, mounting location indicators 142). The bottom surface of heat sink 140 (see FIGS. 10 and 12), includes channels 141, indicators 142, aperture 145 and mounting locations 146 for light emitting members 150.

When luminaire 100 is assembled, the light emitting members 150 are positioned adjacent an edge of the light guide 170. In the illustrated embodiment, the light emitting members 150 are elongated rectangles with widths substantially longer than their heights, although in alternate embodiments the light emitting members may have other geometric shapes. When the one or more light emitting members 150 are illuminated, light enters light guide 170 through the portion of the light guide 170 adjacent to the light emitting member, for example the edge surface 171, travels through the light guide 170, and a majority of the light is redirected approximately 90 degrees (downwardly in the illustrated example embodiment) by optical features in the light guide 170. In the illustrated embodiment, these optical features in light guide 170 redirect the light entering light guide 170 from any of the edges 171 from the initial direction of propagation and toward the emitting surface 172, which in terms of the directions depicted in FIGS. 1-7 is in the downward direction.

The edge surfaces 171 define a linear edge of the light guide 170 extending from one corner to another, which corresponds to the shape of the light emitting member. However, other embodiments may have edge surfaces that are not linear, and in some embodiments the shape of the light emitting members 150 corresponds to the shape of the edge surfaces, which can help minimize the space between the light emitting member and the light guide and help limit the amount of light that can escape between the light emitting member and the light guide.

In the illustrated embodiment, the light directing features of light guide 170 are omni-directional in that all light propagating horizontally through light guide 170, irrespective of its direction, is directed downward. Using an omni-directional light guide, simplifies the manufacturing process since rotational orientation of the light guide 170 during the formation of the outer edges 171 or during the assembly of the luminaire 100 has little, if any, effect on the overall performance of luminaire 100. Nevertheless, some embodiments use light guides 170 with optical properties that vary depending on the direction light travels through the light guide 170 in order to create different illumination patterns.

Since the number and location pattern can be determined and the arrangement of the light emitting members During operation, the individual light emitting sources (for example, LEDs 154) included in light emitting members 150 illuminate. The light produced by the one or more light emitting members then enters light guide 170 through the one or more edge surfaces 171 adjacent to each individual light emitting member. After entering light guide 170, the light encounters the optical features of light guide 170, and a majority of the light generated by the one or more light emitting members 150 will be directed out of the light guide 170 through emitting surface 172.

Due to various reasons, which include manufacturing imperfections, some of the light will escape out of the top surface 173 of light guide 170, and will be reflected back toward light guide 170 by reflector 160. The light reflected by reflector 160 will eventually pass through emitting surface 172 and illuminate objects positioned to receive light from luminaire 100.

Figure 9:
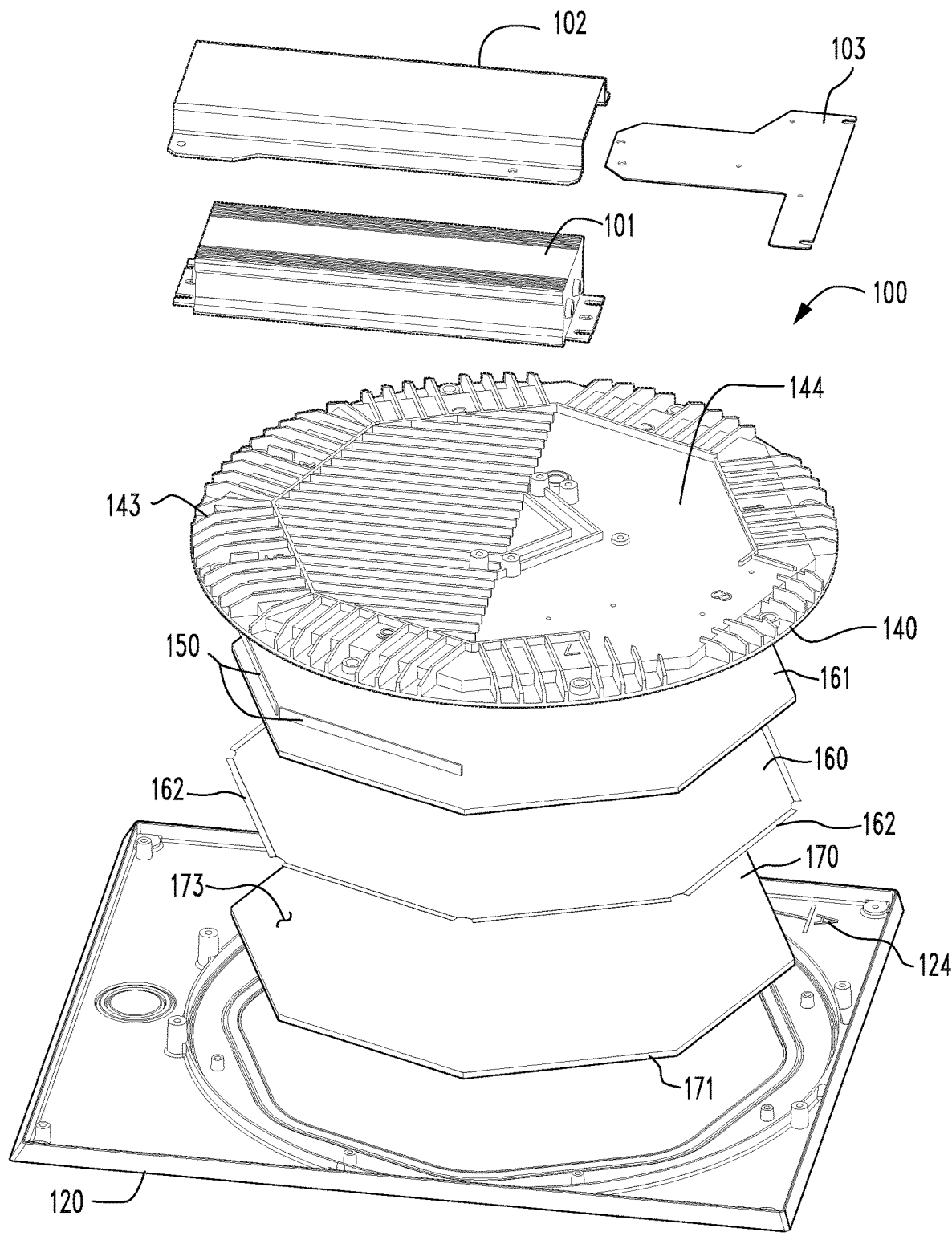
FIG. 9 is an exploded view of the lower assembly depicted in FIG. 8.
Figure 10:
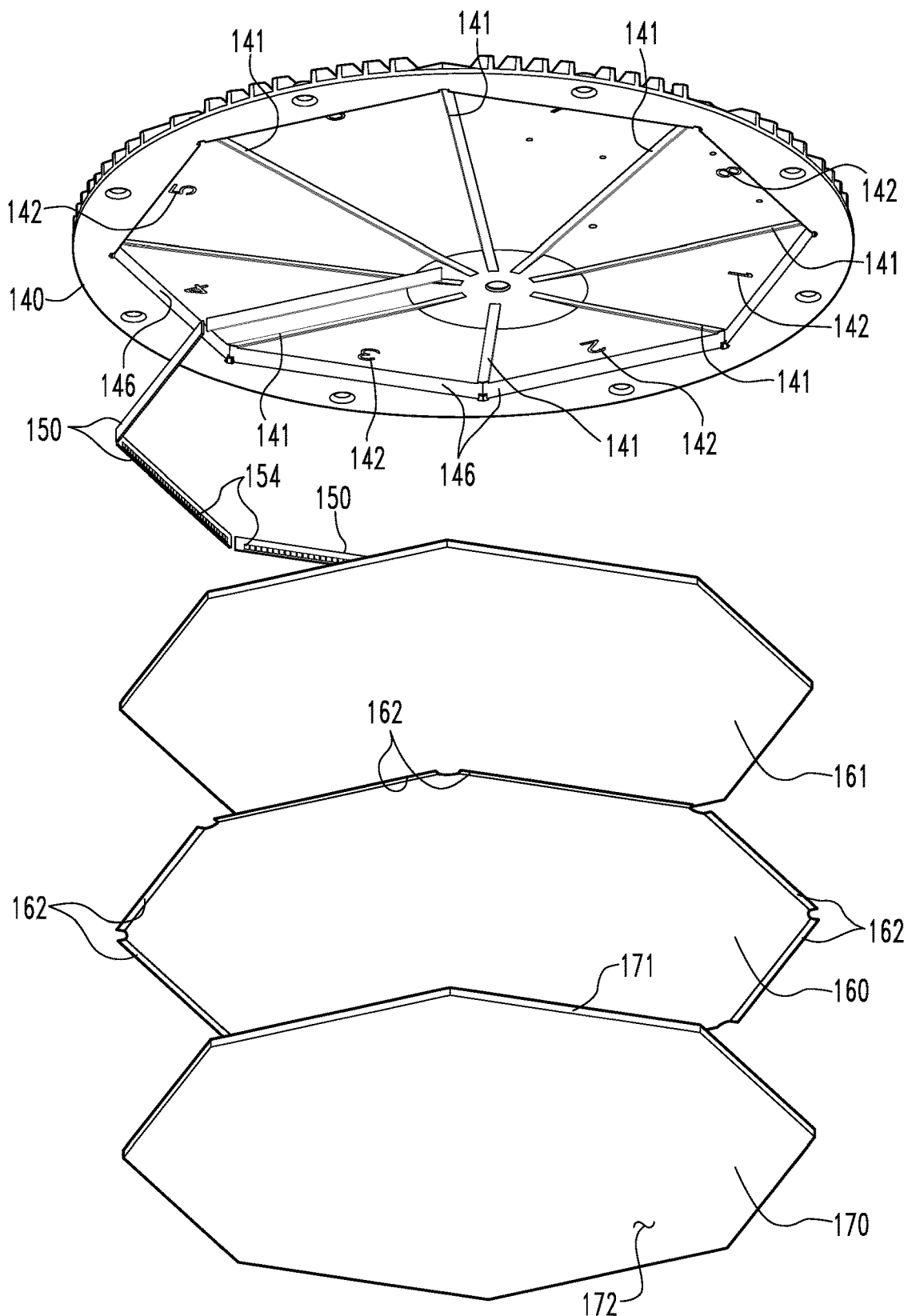
FIG. 10 is an exploded view of a portion of the lower assembly depicted in FIG. 9 from an alternative perspective.
Figure 11:
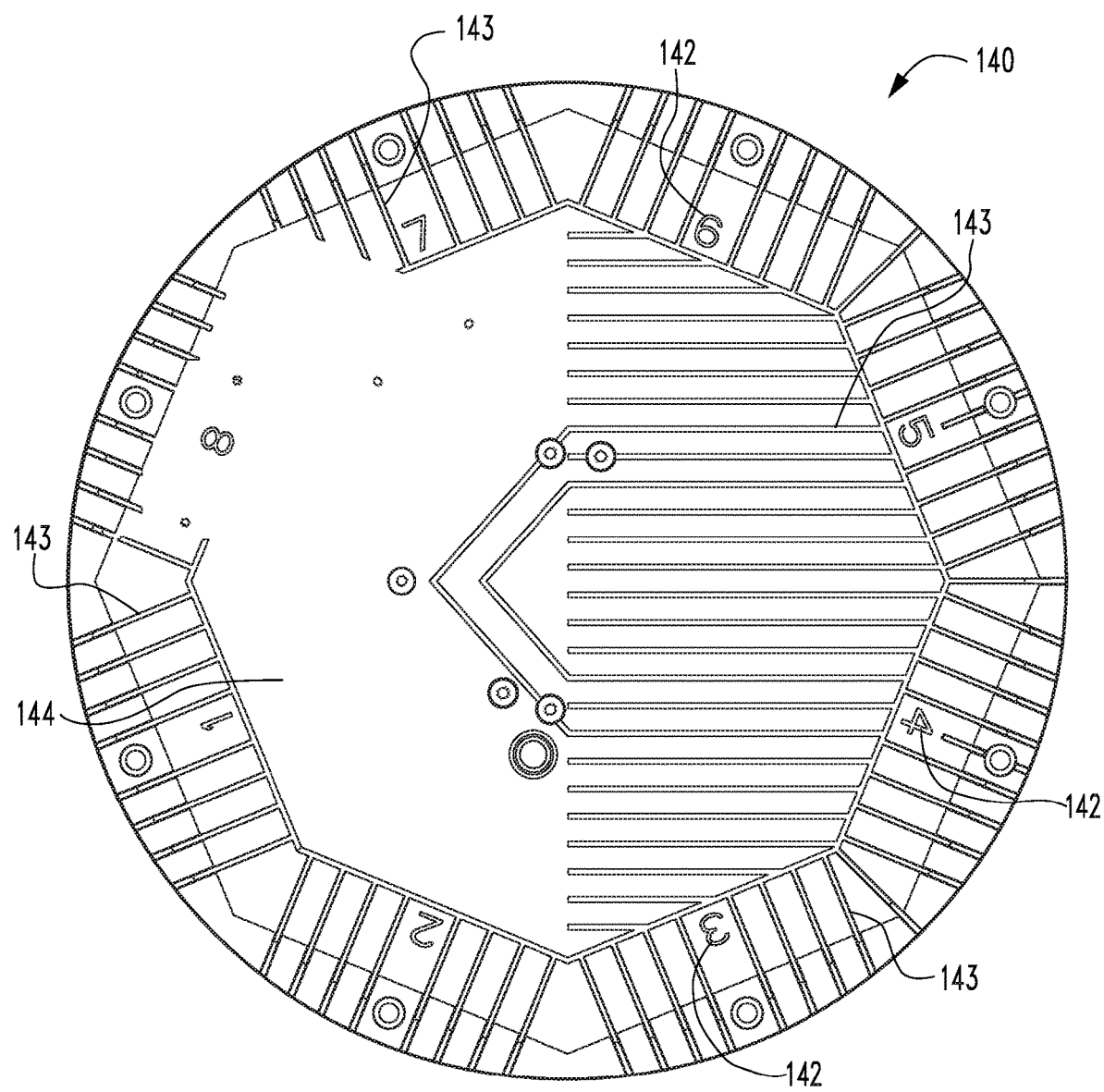
FIG. 11 is a top plan view of the heat sink depicted in FIG. 8.

The presence or absence of a light emitter 150 in any one of the mounting locations 146 affects the light pattern generated by luminaire 100. By choosing the proper type and number of light emitting members 150, placing each of these light emitting members in the appropriate mounting locations 146, and orienting heat sink 140 in a specified orientation (such as by aligning an indicator on heat sink 140 with one of a number of indicators on lower housing 120, or aligning an indicator on lower housing 120 with one of a number of indicators on heat sink 140), light emitting patterns satisfying different light emitting standards can be met. For example, placing a light member 150 in mounting locations 3, 4, and 5, as depicted in FIG. 10 can produce a light pattern satisfying one lighting standard. Placing a light emitting member 150 at each of mounting locations 8, 1, and 2 as depicted in FIG. 9 can produce a light pattern satisfying another lighting standard. Example standards that can be met by luminaire 100 include lighting standards for type II, type III, type VS and/or forward throw distributions.

Indicators 142 are included to facilitate quick and accurate assembly of luminaire 100. For example, indicators 142 are identifiably distinct (for example, readily distinguishable) from one another and information (such as a table, database or key) correlating different lighting effects (for example, different lighting standards) with different positions, types, and numbers of light emitting members can be created. The information will typically identify different groupings of the indicators 142. For example, one group can have one or more indicators 142 (for example, indicator 1), another group will have a different one or more indicators 142 (for example, indicators 1 and 3), a further group can have still different one or more indicators 142 (for example, indicator 3), and still another group can have still different one or more indicators 142 (for example, indicators 4 and 6). See, for example, Table 1. When it is desired to manufacture a luminaire according to one of the lighting patterns specified in the table, the person or machine assembling luminaire 100 need only determine the mounting locations that receive a light emitting member 150 and the type of light emitting member 150 (since different types of light emitting members will emit light that is optically different) to be placed in each mounting location 146 in order to assemble a luminaire 100 that will meet the desire lighting standard.

Indicators 142 may also facilitate alignment of the heat sink 140 with the lower housing 120. For example, the lower housing 120 can include one or more orientation indicators 124 with which a select one or more indicator 142 may be aligned to place heat sink 140 (and consequently light emitting members 150) in the appropriate orientation with respect to lower housing 120 in order to achieve a particular light distribution pattern. In the depicted embodiment indicators 142 on heat sink 140 are used as mounting location indicators facilitating the mounting of appropriate light members 150 in the appropriate locations 146 and as orientation indicators facilitating the mounting of heat sink 140 in the appropriate orientation in lower housing 120. Alternate embodiments include orientation indicators that are distinct from the mounting location indicators.

In the illustrated embodiment, light emitting members 150 are sized to span an edge of light guide 170. Light emitting members 150 may also be sized to contact one another when assembled, which reduces the ability of light to escape into undesirable locations, such as the interior of luminaire 100.

Mounting locations 146 are depicted as including vertical surfaces on the perimeter of a recessed portion. The recessed portion can receive the light emitting members 150, the shock absorption member 161, the reflector 160, and/or the light guide 170. In alternate embodiments there is no recessed portion, and the light emitting members 150, the shock absorption member 161, the reflector 160, and the light guide 170 are mounted "on top" of a generally flat surface of the heat sink 140.

Reflector 160 optionally includes one or more portions, for example tabs 162, that can facilitate the assembly and performance of the luminaire 100. Tabs 162 are configured to be positioned adjacent the edge surfaces 171 of light guide 170 that do not have an adjacent light emitting member 150. In the illustrated embodiment, tabs 162 are oriented in the same general plane as reflector 160 and are bent toward an edge surface 171 of light guide 170 that does not have an associated light emitting member 150. In some embodiments, one or more tabs 162 correlating with a mounting location 146 that contains a light emitting member 150 are configured to avoid interference with installed light emitting members 150 and left alone in their original, unbent orientation. In still further embodiments, tabs 162 will interfere with light emitting members 150, and may be configured to fill the space that would otherwise be occupied by a light emitting member 150 and are removed when physical interference between tab 162 and light emitting member 150 is expected. In still further embodiments, reflectors 160 can be pre-bent so they will be adjacent the edge surface 171 of light guide 170 when luminaire 100 is assembled.

Although the shape of the light guide 170 is depicted as being octagonal, other embodiments use different shapes. Polygons, of any shape and numbers of sides may be used although advantages may be realized when using regular polygons (polygons with equal length sides and equal angles between adjacent sides) and polygons that have mirror symmetry.

Figure 12:
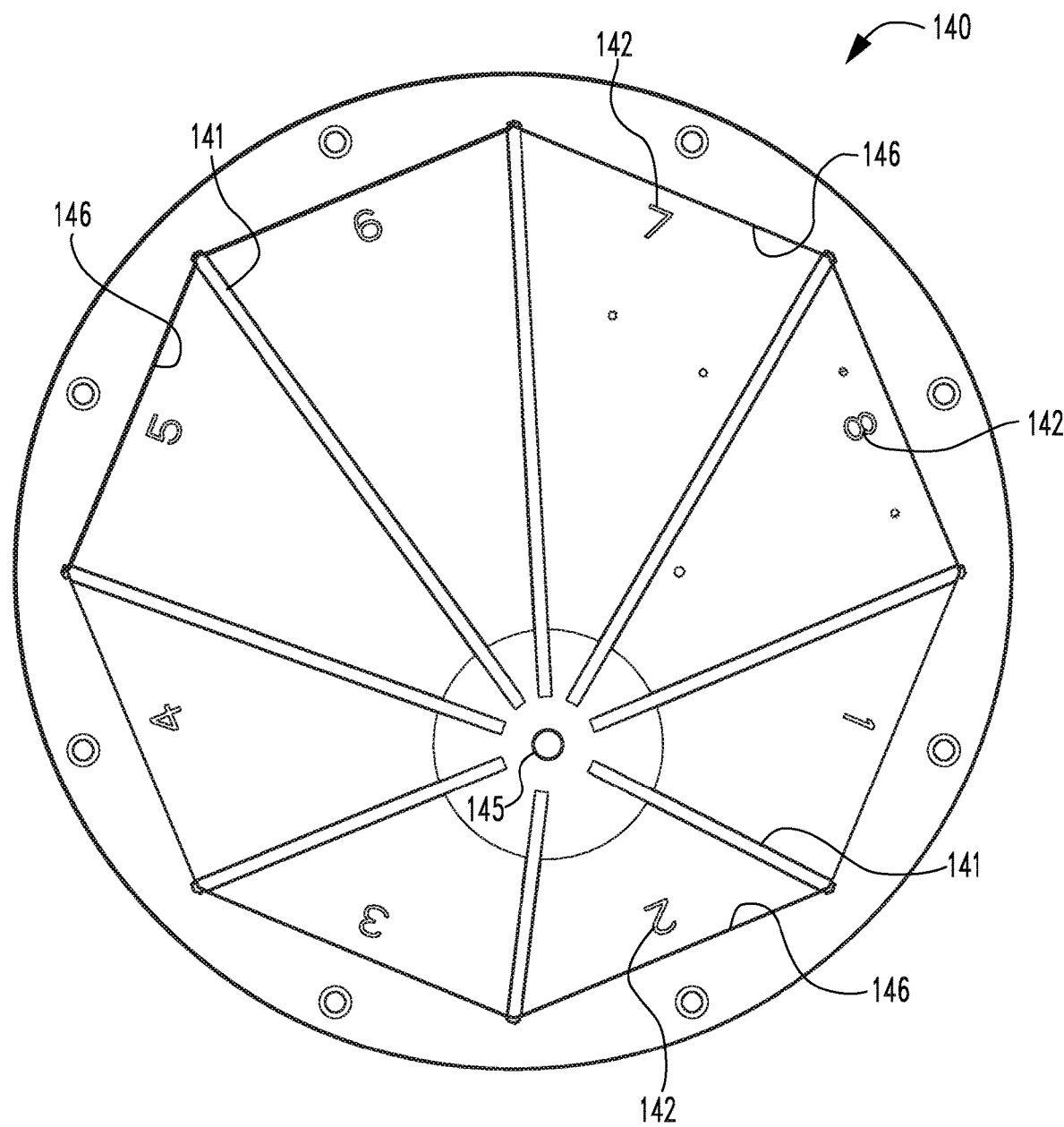
FIG. 12 is a bottom plan view of the heat sink depicted in FIG. 8.

Also depicted in FIGS. 10 and 12 are optional channels 141. In embodiments where the light emitting members 150 include power leads at the ends of each light emitting member 150, channels 141 provide convenient pathways to route the power leads to the power source and facilitate more efficient assembly and a luminaire 100 that is more robust. In the illustrated embodiment, channels 141 lead to a common aperture 145 through which the power leads are passed through heat sink 140 to be connected to driver 101.

Figure 13:
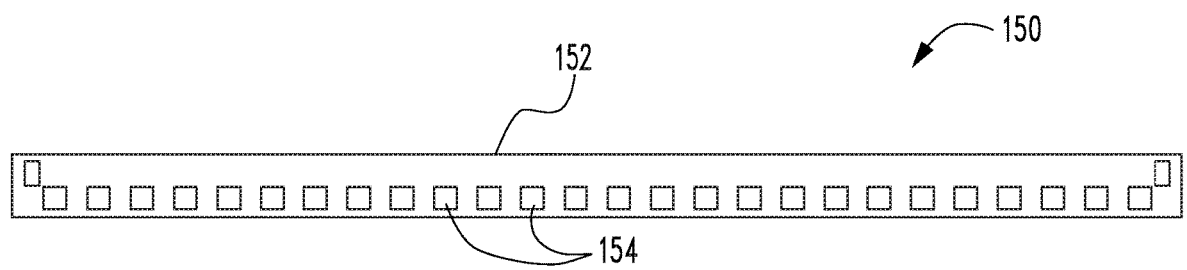
FIG. 13 is a front elevational view of a light emitting array according to one embodiment of the present disclosure.

Depicted in FIG. 13 is a light emitting member 150 according to one embodiment of the present disclosure. Light emitting member 150 includes one or more light sources (for example, LEDs 154) and a base 152. Although not depicted in the illustration, the LEDs 154 are electrically connected to a power source with electrical leads connected to the ends (short sides) of the base 152. The light emitting member 150 is sized to mount to heat sink 140 at any of the mounting locations 146.

Figure 14:
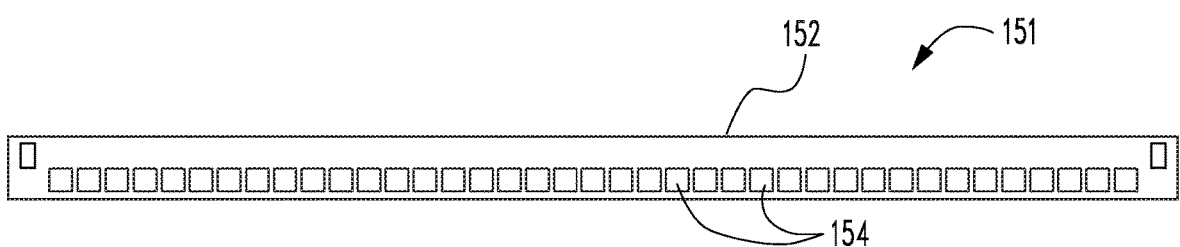
FIG. 14 is a light emitting array according to another embodiment of the present disclosure.

FIG. 14 shows a light emitting member 151 according to another embodiment of the present disclosure. Light emitting member 151 includes one or more light sources (for example LEDs 154) and a base 152. Light emitting member 151 has a length equal to the length of light emitting member 150. As such, light emitting member 151 and light emitting member 150 can each be mounted to a mounting location 146 on heat sink 140 and can be considered as two different types of light emitting members. The number and arrangement of LEDs 154 in light emitting member 151 is different than the number and arrangement of LEDs 154 in lighting emitting member 150. As such, the light emanating from luminaire 100 will be different when a light emitting member 151 is located in a mounting position 146 in place of light emitting member 150. While the arrangement of LEDs 154 in both light emitting member 150 and light emitting member 151 are linear, other embodiments include differently arranged arrays of LEDs 154.

Shown in Table 1 is an example of a correlation table that may be used when forming a luminaire 100 according to one embodiment of the present disclosure. For example, if it was desired to manufacture a luminaire 100 that would meet the requirements of lighting standard B, a first light emitting member 150 would be mounted in the mounting location 146 correlating to indicator 3, a second light emitting member 150 would be mounted to the mounting location 146 correlating with indicator 5, and heat sink 140 would be mounted to lower housing 120 in orientation X. As another example, if it was desired to form a luminaire 100 meeting lighting standard K, two light emitting members 150 would be mounted to heat sink 140 (one each in the mounting locations 146 corresponding to indicators 3 and 6), two light emitting members 151 would be mounted to heat sink 140 (one in each mounting location 146 corresponding to indicators 4 and 5), and heat sink 140 would be mounted to lower housing 120 in orientation Y.

TABLE 1

| Lighting Standard | Light Emitting Member Type | Mounting Locations | Heat Sink Orientation |
|---|---|---|---|
| A | 150 | 3, 6 | X |
| B | 150 | 3, 5 | X |
| C | 151 | 3, 4, 5, 6 | X |
| D | 151 | 1, 3, 5, 7 | X |
| E | 150 | 4, 5 | X |

TABLE 1-continued

| Lighting Standard | Light Emitting Member Type | Mounting Locations | Heat Sink Orientation |
|---|---|---|---|
| F | 150 | 3, 6 | X |
|   | 151 | 4, 5 |   |
| G | 150 | 3, 6 | Y |
| H | 150 | 3, 5 | Y |
| I | 151 | 3, 4, 5, 6 | Y |
| J | 150 | 4, 5 | Y |
| K | 150 | 3, 6 | Y |
|   | 151 | 4, 5 |   |

As used herein, similar or substantially similar implies that the objects or members being described function and operate for the purposes being described in a manner that is almost indistinguishable to a person of ordinary skill in the art. For example, if a light emitting member is required (such as in a claim) to emit light with a certain intensity or pattern, the differences in the intensity or pattern of the light being emitted from similar light emitting members should be almost indistinguishable. However, if a light emitting member is merely required (such as in a claim) to emit light and the intensity, pattern, color, etc. is not a defined or required parameter, then similar light emitting members can emit light of any intensity, pattern, color, etc. as long as they emit light. As another example, if a light emitting member is required (such as in a claim) to be mounted to another object, the differences in the ability to mount substantially similar light emitting members to the object will be almost indistinguishable.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

ELEMENT NUMBERING

Table 2 includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

TABLE 2

| | |
|---|---|
| 100 | Luminaire |
| 101 | Driver |
| 102 | Bracket (top) |
| 103 | Bracket (side) |
| 110 | Upper Housing |
| 112 | Lower Assembly |
| 120 | Lower Housing |
| 122 | Aperture |
| 124 | Orientation Indicator |
| 130 | Mount |
| 140 | Heat Sink |
| 141 | Channel |
| 142 | Mounting Location Indicator/Orientation Indicator |
| 143 | Cooling Fin |
| 144 | Uncooled Portion |
| 145 | Aperture |
| 146 | Mounting Location |
| 150 | Light Emitting Member ($1^{st}$ embodiment) |
| 151 | Light Emitting Member ($2^{nd}$ embodiment) |
| 152 | Base |
| 154 | LED/Light Emitting Source |
| 160 | Reflector |
| 161 | Foam |
| 162 | Tab |
| 170 | Light Guide |
| 171 | Edge Surface |
| 172 | Outer Emitting Surface |
| 173 | Inner Top Surface |

What is claimed is:

1. A method of manufacturing a luminaire, comprising:
selecting a lighting base from a plurality of similar lighting bases, each lighting base including a plurality of mounting locations and a plurality of mounting location indicators, each mounting location indicator being associated with a mounting location, and each mounting location indicator being identifiable from the other of the plurality of mounting location indicators;
selecting at least one light emitting member from a plurality of similar light emitting members, each of the plurality of light emitting members being configured to mount to a mounting location;
identifying from predetermined information a particular mounting location and associated mounting location indicator to which the light emitting member can be attached to achieve a desired lighting pattern, the predetermined information correlating different illumination patterns with the mounting of light emitting members at different mounting locations;
locating on the selected lighting base a mounting location indicator corresponding to the mounting location indicator identified from the predetermined information;
mounting the selected light emitting member to the mounting location on the selected lighting base associated with the located mounting location indicator; and
mounting a light guide to the lighting base with an edge surface of the light guide being adjacent the mounted light emitting member.

2. The method of claim 1, wherein the light emitting members are elongated, the light guide is planar and includes at least three linear side edges, and the selected lighting base includes at least three mounting locations corresponding to the at least three linear side edges, the method comprising:
arranging at least one mounting location to not have a light emitting member connected thereto.

3. The method of claim 1, wherein the light guide is planar and includes at least one side edge, the method comprising:
removing an edge portion of a reflector configured to reflect light emanating from at least one surface of the light guide back toward the light guide; and
mounting the reflector adjacent the light guide with the removed edge portion positioned adjacent the mounting location on the selected lighting base associated with the located mounting location indicator.

4. The method of claim 1, wherein
said selecting at least one light emitting member includes selecting at least two light emitting members,
said identifying includes identifying at least two particular mounting locations and associated mounting location indicators to which the at least two light emitting members can be attached to achieve a desired lighting pattern from predetermined information, and
said mounting includes mounting the at least two selected light emitting members to the mounting locations on the selected lighting base associated with the located mounting location indicators and with the at least two selected light emitting members contacting one another.

5. The method of claim 1, wherein the plurality of mounting locations are configured to supply electrical power to a light emitting members mounted thereto.

6. The method of claim 1, wherein each lighting base includes an orientation indicator, the method comprising:
selecting a housing from a plurality of similar housings, each housing including an orientation indicator;
identifying from the predetermined information a particular mounting orientation for mounting the selected lighting base to the selected housing to achieve the desired lighting pattern, the predetermined information correlating different lighting patterns with a plurality of mounting orientations of the lighting base and the housing;
aligning the orientation indicator of the selected lighting base with the orientation indicator of the selected housing; and
mounting the selected lighting base to the selected housing in the orientation identified from the predetermined information.

7. A configurable lighting kit, comprising:
a plurality of light guides;
a plurality of light emitting members;
a plurality of base members, each base member configured to connect to a light guide, each base member defining a plurality of mounting locations and a plurality of labels, each mounting location configured to mount to one of the plurality of light emitting members, each label being associated with a different mounting location, and each label being identifiably distinct from the other labels; and
an information key identifying two different groupings of one or more mounting location labels;
wherein one of the plurality of light guides, one of the plurality of base members, and one of the plurality of light emitting members combine in two configurations including,
a first configuration wherein a light guide selected from the plurality of light guides is connected to a base member selected from the plurality of base members and a light emitting member selected from the plurality of light emitting members is mounted to a mounting location selected from the base member's plurality of mounting locations according to a first of the two different information key groupings, the first configuration producing a first lighting pattern when the light emitting member is illuminated, and a second configuration wherein a light guide selected from the plurality of light guides is connected to a base member selected from the plurality of base members and a light emitting member selected from the plurality of light emitting members is mounted to a mounting location selected from the base member's plurality of mounting locations according a second of the two different information key groupings, the second configuration producing a second lighting pattern when the light emitting member is illuminated, the second lighting pattern being different from the first lighting pattern.

8. The configurable lighting kit of claim 7, wherein the plurality of light guides are substantially similar, the plurality of light emitting members are substantially similar, and the plurality of base members are substantially similar.

9. The configurable lighting kit of claim 7, wherein each of the plurality of light emitting members is an elongated array of light emitting diodes, each of the plurality of light guides is a planar light guide, and the first configuration includes the elongated array of light emitting diodes being mounted adjacent an edge of the planar light guide.

10. The configurable light kit of claim 9, wherein each of the plurality of light emitting members in the first configuration contact one another inhibiting light from passing between the light emitting members.

11. The configurable lighting kit of claim 9, wherein the first configuration includes the elongated array of light emitting diodes being mounted adjacent an outer perimeter of the planar light guide.

12. The configurable lighting kit of claim 11, wherein the planar light guide is a regular polygon.

13. The configurable lighting kit of claim 7, wherein the plurality of base members include channels adjacent the mounting locations, the channels being configured to receive power cables for connecting mounted light emitting members to a power source.

14. The configurable lighting kit of claim 7, wherein the first configuration includes at least one mounting location with no light emitting member mounted thereto.

15. The configurable lighting kit of claim 7, comprising:
a plurality of reflectors, each configured to reflect light;
wherein the first configuration includes a reflector selected from the plurality of reflectors connected to the base member, the reflector having a reflecting portion positioned proximally to a mounting location with no light emitting member mounted thereto.

16. The configurable lighting kit of claim 7, comprising:
a plurality of reflectors configured to reflect light, each with a plurality of reflecting portions;
wherein the first configuration includes a reflector selected from the plurality of reflectors connected to the base member, the reflector having
a reflecting portion positioned proximally to a mounting location with no light emitting member mounted thereto, and
a surface adjacent a light emitting member, the surface being formed by the removal of a reflecting portion.

17. The configurable lighting kit of claim 7, wherein the plurality of light emitting members include at least two groups, each light emitting member in a group being substantially similar, the light emitting members in a first group being optically different from the light emitting members in a second group, and at least one light emitting member from each light emitting member group is included in at least one of the information key groupings.

18. The configurable lighting kit of claim 17, wherein the plurality of base members include at least two groups, each base member in a group being substantially similar, the base members in a first group being different from the base members in a second group, and at least one base member from each base member group is included in at least one of the information key groupings.

19. The configurable lighting kit of claim 7, wherein the plurality of base members include at least two groups, each base member in a group being substantially similar, the base members in a first group being different from the base members in a second group, and at least one base member from each base member group is included in at least one of the information key groupings.

20. A configurable lighting kit, comprising:
a plurality of light guides;
a plurality of light emitting members;
a plurality of base members, each base member configured to connect to a light guide, each base member defining a plurality of mounting locations and a plurality of labels, each mounting location configured to mount to one of the plurality of light emitting members, each label being associated with a different mounting location, and each label being identifiably distinct from the other labels; and
means for identifying two different groupings of one or more mounting location labels;
wherein one of the plurality of light guides, one of the plurality of base members, and one of the plurality of light emitting members combine in two configurations including,
a first configuration wherein a light guide selected from the plurality of light guides is connected to a base member selected from the plurality of base members and a light emitting member selected from the plurality of light emitting members is mounted to a mounting location selected from the base member's plurality of mounting locations according to a first of the two different information key groupings, the first configuration producing a first lighting pattern when the light emitting member is illuminated, and
a second configuration wherein a light guide selected from the plurality of light guides is connected to a base member selected from the plurality of base members and a light emitting member selected from the plurality of light emitting members is mounted to a mounting location selected from the base member's plurality of mounting locations according a second of the two different information key groupings, the second configuration producing a second lighting pattern when the light emitting member is illuminated, the second lighting pattern being different from the first lighting pattern.

21. A method of manufacturing a luminaire, comprising:
selecting a housing from a plurality of similar housings, each housing including a first orientation indicator;
selecting a lighting base from a plurality of similar lighting bases, each lighting base including a plurality of mounting locations and a plurality of mounting location indicators, each mounting location indicator being associated with a mounting location, and each mounting location indicator being identifiable from the other of the plurality of mounting location indicators, wherein each lighting base further includes a second orientation indicator;

selecting at least one light emitting member from a plurality of similar light emitting members, each of the plurality of light emitting members being configured to mount to a mounting location;

identifying from predetermined information a particular mounting location and associated mounting location indicator to which the light emitting member can be attached to achieve a desired lighting pattern, the predetermined information correlating different illumination patterns with the mounting of light emitting members at different mounting locations;

locating on the selected lighting base a mounting location indicator corresponding to the mounting location indicator identified from the predetermined information;

mounting the selected light emitting member to the mounting location on the selected lighting base associated with the located mounting location indicator;

identifying from the predetermined information a particular mounting orientation for mounting the selected lighting base to the selected housing to achieve the desired lighting pattern, the predetermined information correlating different lighting patterns with a plurality of mounting orientations of the lighting base and the housing;

aligning the first orientation indicator of the selected housing with the second orientation indicator of the selected lighting base; and mounting the selected lighting base to the selected housing in the orientation identified from the predetermined information.

22. The method of claim 21, comprising:

mounting a light guide to the lighting base with an edge surface of the light guide being adjacent the mounted light emitting member.

23. The method of claim 22, wherein the light emitting members are elongated, the light guide is planar and includes at least three linear side edges, and the selected lighting base includes at least three mounting locations corresponding to the at least three linear side edges, the method comprising:

arranging at least one mounting location to not have a light emitting member connected thereto.

24. The method of claim 22, wherein the light guide is planar and includes at least one side edge, the method comprising:

removing an edge portion of a reflector configured to reflect light emanating from at least one surface of the light guide back toward the light guide; and mounting the reflector adjacent the light guide with the removed edge portion positioned adjacent the mounting location on the selected lighting base associated with the located mounting location indicator.

25. The method of claim 21, wherein said selecting at least one light emitting member includes selecting at least two light emitting members, said identifying includes identifying at least two particular mounting locations and associated mounting location indicators to which the at least two light emitting members can be attached to achieve a desired lighting pattern from predetermined information, and said mounting includes mounting the at least two selected light emitting members to the mounting locations on the selected lighting base associated with the located mounting location indicators and with the at least two selected light emitting members contacting one another.

26. The method of claim 21, wherein the plurality of mounting locations are configured to supply electrical power to a light emitting members mounted thereto.

* * * * *